(12) United States Patent
Kountanya et al.

(10) Patent No.: US 12,589,459 B2
(45) Date of Patent: Mar. 31, 2026

(54) IN-SITU GRINDING WHEEL TOPOGRAPHY, POWER MONITORING, AND FEED/SPEED SCHEDULING SYSTEMS AND METHODS

(71) Applicant: RAYTHEON TECHNOLOGIES CORPORATION, Farmington, CT (US)

(72) Inventors: Raja Krishnan Kountanya, Vernon, CT (US); Eric Fromerth, Bolton, CT (US); Donald J. Leclerc, III, South Windsor, CT (US); Demetrios Koukouves, Newington, CT (US); Changsheng Guo, South Windsor, CT (US); Alex James Sardo, Billings, MT (US)

(73) Assignee: RTX CORPORATION, Farmington, CT (US)

( * ) Notice: Subject to any disclaimer, the term of this patent is extended or adjusted under 35 U.S.C. 154(b) by 531 days.

(21) Appl. No.: 18/149,320

(22) Filed: Jan. 3, 2023

(65) Prior Publication Data

US 2023/0241741 A1     Aug. 3, 2023

Related U.S. Application Data

(60) Provisional application No. 63/304,436, filed on Jan. 28, 2022.

(51) Int. Cl.
*B23Q 17/09* (2006.01)
*G05B 17/02* (2006.01)

(52) U.S. Cl.
CPC ......... *B23Q 17/0952* (2013.01); *G05B 17/02* (2013.01)

(58) Field of Classification Search
CPC ............... B23Q 17/0952; G05B 17/02; G05B 2219/49168; G05B 2219/49171;
(Continued)

(56) References Cited

U.S. PATENT DOCUMENTS 5,044,125 A     9/1991 Lambert, Jr. et al.
7,664,565 B2     2/2010 Stammen
(Continued)

FOREIGN PATENT DOCUMENTS

CN     103105152 B  *  8/2015
CN     113084707     7/2021
(Continued)

OTHER PUBLICATIONS

W. Liu et al. (hereinafter Liu), "Parametric evaluation and three-dimensional modelling for surface topography of grinding wheel", International Journal of Mechanical Sciences 155 (2019) 334-342. (Year: 2019).*

(Continued)

*Primary Examiner* — Eman A Alkafawi
*Assistant Examiner* — Dilara Sultana
(74) *Attorney, Agent, or Firm* — SNELL & WILMER L.L.P.

(57) ABSTRACT

Feed rate scheduling methods include measuring a topography of a grinding wheel of a machine tool, calculating a topography parameter using the topography, and calculating a feed rate scheduling parameter for a toolpath of the grinding wheel based on the topography parameter. The topography may be measured using microscopy. The topography parameter may include a plurality of parameters including a density of crystals at a given depth ($C(h)$) of the grinding wheel and/or an area fraction of crystals protruding at a given depth ($\alpha(h)$) of the grinding wheel. The feed rate scheduling parameter may include a grinding wheel feed rate, a grinding wheel spin rate, and/or a grinding wheel cutting depth, among other parameters.

20 Claims, 7 Drawing Sheets

(58) Field of Classification Search
CPC .......... G05B 2219/49181; G05B 2219/50311;
G05B 2219/50312; G05B 19/404; G05B
19/4163; G05B 19/4069; B24B 49/10;
B24B 49/12; B24B 49/14; B24B 47/18;
B24B 49/183; B24B 53/00
See application file for complete search history.

(56) References Cited

U.S. PATENT DOCUMENTS

| | | | |
|---|---|---|---|
| 2015/0127139 A1 | 5/2015 | Bolin et al. | |
| 2020/0189061 A1 | 6/2020 | Scholze et al. | |
| 2021/0278817 A1 | 9/2021 | Xie et al. | |

FOREIGN PATENT DOCUMENTS

| | | | | |
|---|---|---|---|---|
| JP | 2006341358 | 12/2006 | | |
| WO | WO-2021048027 A1 * | 3/2021 | .......... | B23F 23/1218 |

OTHER PUBLICATIONS

B. Kang et al "Effect of the grinding parameters on surface topography considering vibration characteristics", 2021 International Conference on Computer Information Science and Artificial Intelligence (CISAI), Kunming, China, 2021, pp. 878-885, (Year: 2021).*

A. Bazan et al. "Determination of Selected Texture Features on a Single-Layer Grinding Wheel Active Surface for Tracking Their Changes as a Result of Wear," Materials (Basel). Dec. 2, 20202;14(1):6. (Year: 2020).*

B. Wang et al. "Trajectory Planning and Optimization for Robotic Machining Based on Measured Point Cloud", (Electronic Publication Date: Dec. 8, 2021, ISSN (Electronic): 1941-0468, Electronic Publication Date: Dec. 8, 2021 (Year: 2021).*

Chen Hao et al., "Kinematic simulation of surface grinding process with random cBN grain model", The International Jounral of Advanced Manufacturing Tecnology, Springer, London, vol. 100, No. 9, dated Oct. 20, 2023, pp. 2725-2739, XP036697660, ISSN: 0268-3768, DOI: 10.1007/S00170-018-2840- x, retrieved on Oct. 20, 2018.

European Patent Office, European Search Report dated Jun. 5, 2023 in Application No. 23153553.5.

Kountanya and Guo, "Force and Temperature Modeling in 5—axis Grinding", 2018, p. 521-529, Procedia Manufacturing, available online at www.sciencedirect.com.

Kountanya and Guo, "Specific Material Removal Rate Calculation in Five-Axis Grinding", 2017, p. 1-6, vol. 139, Journal of Manufacturing Science and Engineering.

* cited by examiner

200

200μm

IN-SITU GRINDING WHEEL TOPOGRAPHY, POWER MONITORING, AND FEED/SPEED SCHEDULING SYSTEMS AND METHODS

CROSS REFERENCE TO RELATED APPLICATIONS

This application claims priority to, and the benefit of, U.S. Provisional Patent Application Ser. No. 63/304,436, entitled "IN-SITU GRINDING WHEEL TOPOGRAPHY, POWER MONITORING, AND FEED/SPEED SCHEDULING SYSTEMS AND METHODS," filed on Jan. 28, 2022. The '436 application is hereby incorporated by reference in its entirety for all purposes.

FIELD

The present disclosure relates generally to grinding processes, and more particularly to systems and methods for grinding tool feed rate scheduling.

BACKGROUND

Grinding processes for various components include very complex toolpaths. Optimally designed fixturing is desired to hold the part against the forces incurred during the grinding processes. Some components are typically very slender for purposes of minimizing weight. Accuracies necessary for assembly of aero parts within the engine tend to also be more stringent than, say, in automotive or mold-die components. Consequently, they tend to demand much more sensitive process planning and process parameter selection.

SUMMARY

A feed rate scheduling method is disclosed, comprising measuring the topography of a grinding wheel, calculating topography parameters of the grinding wheel, and calculating feed rate scheduling for a toolpath of the grinding wheel based on the topography parameter.

In various embodiments, the calculating the feed rate scheduling parameter comprises simulating a metal grinding process of the grinding wheel in a virtual machining simulation environment using the topography parameter.

In various embodiments, the step of calculating the feed rate scheduling parameter comprises monitoring an electric power used by the machine tool.

In various embodiments, the calculating the feed rate scheduling parameter comprises determining that the electric power is within a predetermined threshold.

In various embodiments, the topography parameter of the grinding wheel comprises a density of crystals at a given depth (h).

In various embodiments, the topography parameter of the grinding wheel comprises an area fraction of crystals protruding at a given depth (h).

In various embodiments, the feed rate scheduling parameter comprises an instantaneous grinding wheel feed rate.

In various embodiments, the topography parameter comprises a plurality of values as a function of distance with respect to a reference point on the grinding wheel, and the method further comprises limiting the topography parameter to a maximum distance ($h_{max}$).

In various embodiments, the measuring the topography is performed using a microscopy process.

A grinding process simulator for feed rate scheduling for a grinding wheel is disclosed, comprising a virtual machining simulation environment having a processor, and a tangible, non-transitory memory configured to communicate with the processor. The tangible, non-transitory memory has instructions stored thereon that, in response to execution by the processor, cause the virtual machining simulation environment to perform operations comprising measuring a topography of the grinding wheel of a machine tool, calculating a topography parameter using the topography, and calculating a feed rate scheduling parameter for a toolpath of the grinding wheel based on the topography parameter.

A method is disclosed, comprising measuring a topography of a grinding wheel of a machine tool, calculating a plurality of topography parameters of the grinding wheel, wherein the plurality of topography parameters comprises at least one of a density of crystals at a given depth (C(h)) of the grinding wheel, or an area fraction of crystals protruding at a given depth ($\alpha$(h)) of the grinding wheel, and calculating a feed rate scheduling parameter for a toolpath of the grinding wheel based on the plurality of topography parameters.

In various embodiments, the measuring the topography is performed in-situ using a microscopy process.

In various embodiments, the method further comprises limiting a cutting depth of the grinding wheel to a maximum crystal height ($h_{max}$) of the grinding wheel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. Different cross-hatching is used throughout the figures to denote different parts but not necessarily to denote the same or different materials.

Process physics modeling represents a new era in interrogation and optimization of toolpaths.

Until now, its utility has been limited to feed scheduling to optimize for cycle time based on geometric criteria, but can be expanded to forces, power, temperatures, material change, life debit, tool wear/life, etc. through comprehensive inputs capturing details closer to actual prevailing conditions, as provided herein.

In aero parts manufacturing, incoming wheels from a supplier may result in producing more scrap parts and visual observations may indicate topographical differences with legacy wheels. Thus, it is desirable that feed rate scheduling accounts for topographical differences. Moreover, quantitative metrics are desirable for comparison and communication to suppliers. Physics-based models may be used in grinding process planning driven by quantitative wheel topographic metrics. To these ends, it is desirable to formulate derivatives of topographic metrics to directly incorporate into physical models.

Systems and methods of the present disclosure provide feed rate and spindle speed scheduling with real-time wheel topography and power monitoring with process modeling feedback.

Figure 1:
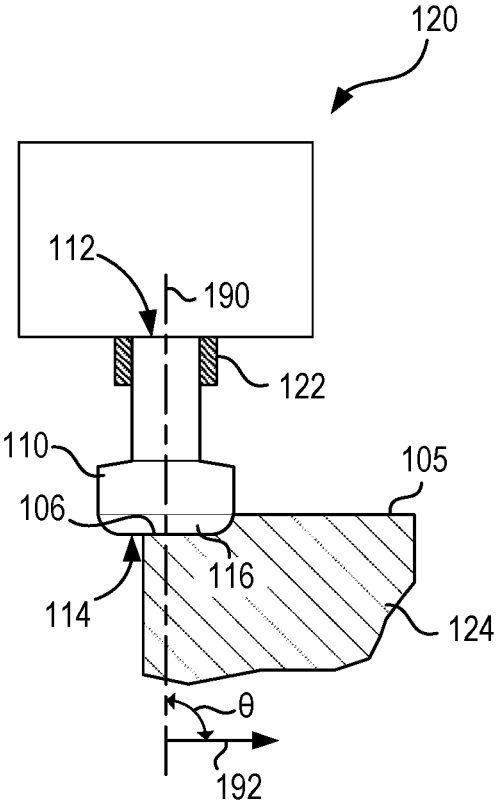
FIG. 1 illustrates various aspects of a grinding wheel mounted to a machine tool and grinding a work piece according to various embodiments.

With reference to FIG. 1, a machine tool 120 comprising a machine tool spindle 122 is illustrated, in accordance with various embodiments. A grinding wheel 110 is shown mounted to machine tool spindle 122. Machine tool spindle 122 may be a multi-axis machine tool spindle 122. The machine tool 120 rotates the grinding wheel 110 about a central longitudinal axis 190 and translates the grinding wheel 110 in one or more directions (e.g., a direction of translation 192) to machine a workpiece 124. In various embodiments, workpiece 124 comprises a nickel-base metallic alloy material. Exemplary rotation is in a rotational direction about central longitudinal axis 190 at a rotational speed in excess of 10,000 rotations per minute (rpm) (e.g., in the range of 40,000 rpm-90,000 rpm in various embodiments). Exemplary translation is in a direction at an angle θ with respect to central longitudinal axis 190 (e.g., in the illustrated embodiment the translational direction is at an angle θ of ninety degrees with respect to central longitudinal axis 190) at a translational speed which is also referred to herein as a feed rate. The feed rate may be limited to a maximum feed rate, for example 100 inches per minute (ipm) in various embodiments. However, it should be understood that the feed rate may vary depending on the cutting effectiveness of grinding wheel 110 and the type of material being cut, among other factors. The traversal of the grinding wheel 110 removes material below a surface 105 and leaves a cut surface 106 on the workpiece 124. Grinding wheel 110 may comprise a rounded cutting surface. The machine tool 120 may further reorient the axis 190. Alternatively, or additionally, the machine tool 120 may reposition or reorient the workpiece 124. In various embodiments, grinding wheel 110 includes a metallic body extending from an aft end 112 to a front (tip) end 114. In various embodiments, grinding wheel 110 comprises an abrasive coating 116 on the tip end to increase cutting effectiveness. Abrasive coating 116 may be located on any periphery surface of grinding wheel 110 depending on which part of grinding wheel 110 is performing the grinding. In various embodiments, abrasive coating 116 comprises a plurality of grains. In various embodiments, abrasive coating 116 comprises a plurality of Cubic Boron Nitride (CBN) grains. In various embodiments, abrasive coating 116 may be applied via an electroplating process.

The present disclosure provides systems and methods for optimized feed rate scheduling (e.g., including choosing an optimum feed rate) of a grinding wheel 110 using grinding wheel topology measurements.

Figure 2A:
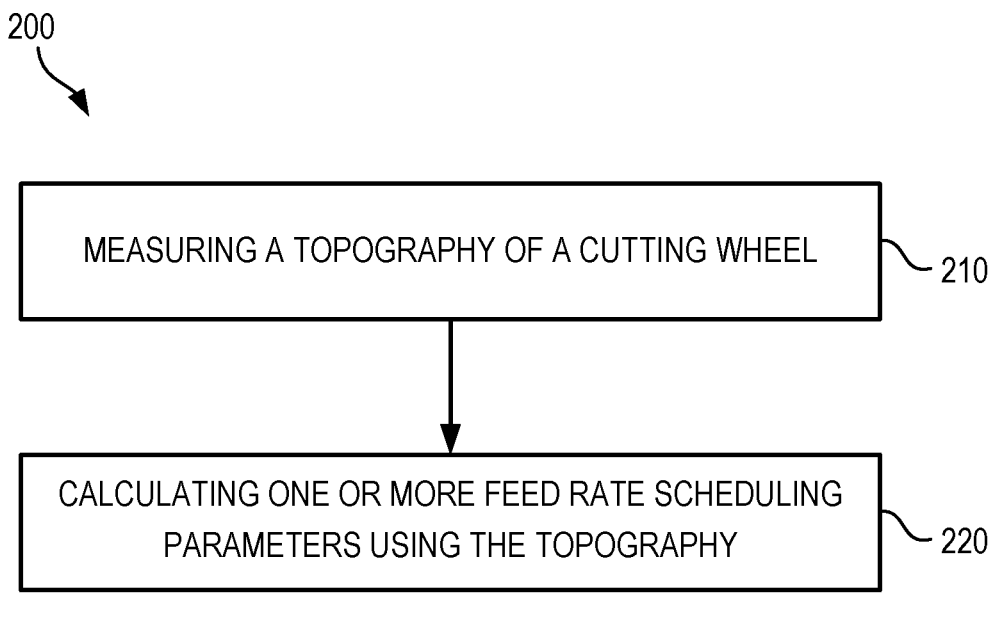
FIG. 2A and FIG. 2B illustrate flow charts for a feed rate scheduling method according to various embodiments.
Figure 3A:
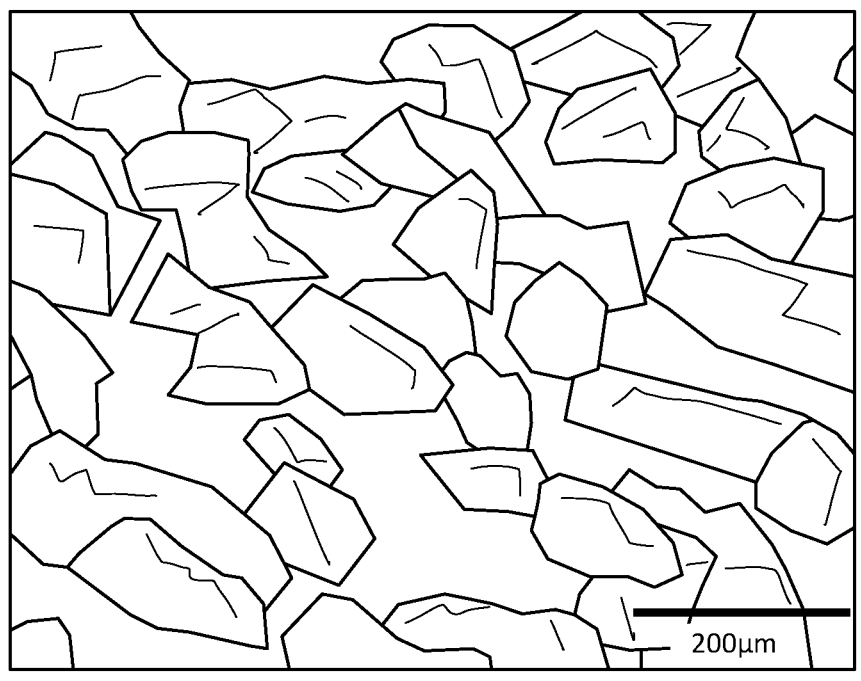
FIG. 3A illustrates an exemplary picture of a surface of a grinding wheel according to various embodiments.
Figure 3B:
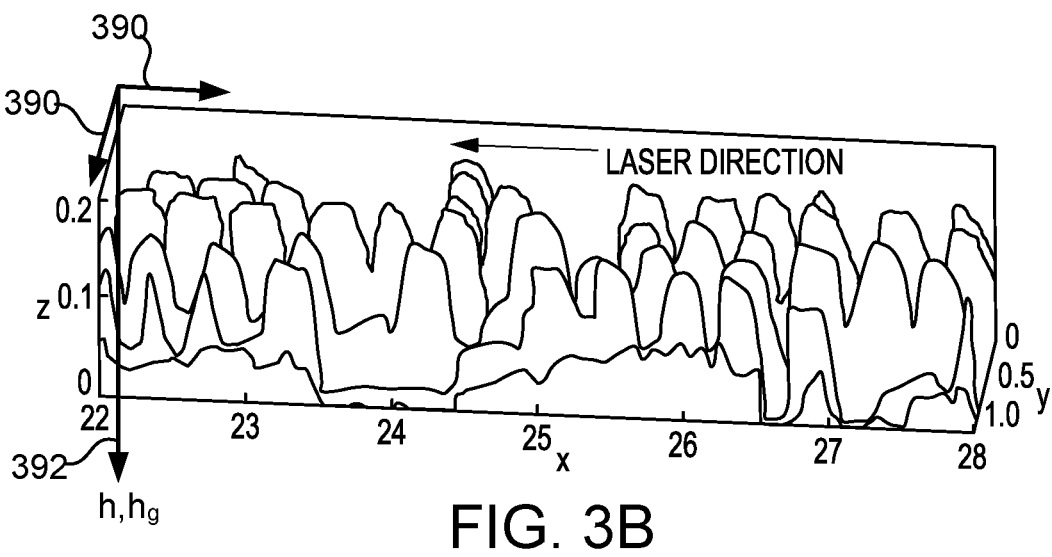
FIG. 3B illustrates a section view of exemplary topographical data of a grinding wheel surface with respect to lateral axes and a topographical axis according to various embodiments.
Figure 3C:
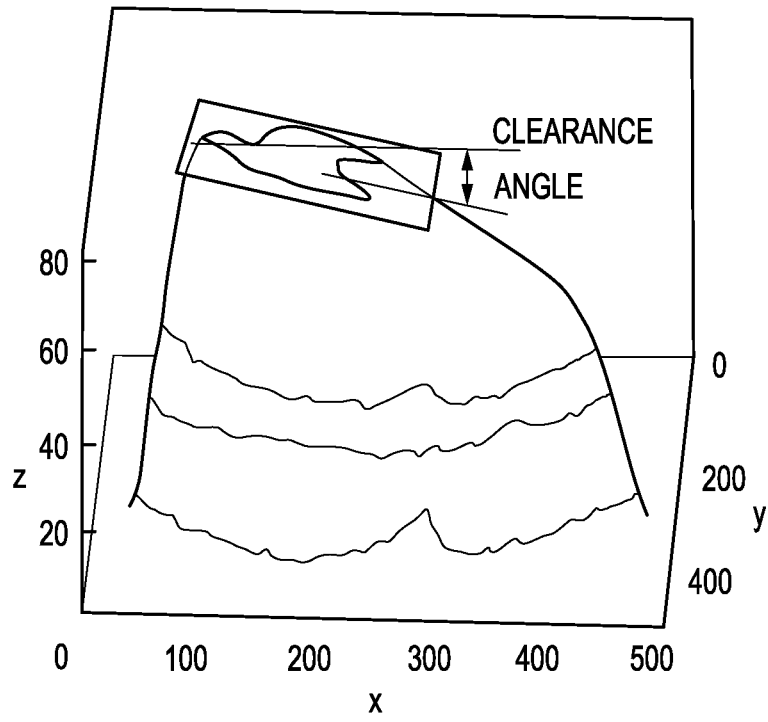
FIG. 3C illustrates an exemplary grain of a grinding wheel surface according to various embodiments.

With reference to FIG. 2A, a method 200 for optimized feed rate scheduling is provided, in accordance with various embodiments. Method 200 includes measuring a topography of a grinding wheel (step 210). With combined reference to FIG. 1 and FIG. 2A, step 210 may include taking a picture of the grinding wheel 110 using microscopy methods (e.g., optical scanning and white-light interferometry, pneumatic topographical measurements, laser topographical measurements, etc.). FIG. 3A illustrates an exemplary picture of a surface of a grinding wheel. As illustrated in FIG. 3A, the surface of the grinding wheel comprises a plurality of grains, each grain capable of removing material from a workpiece at various rates, depths, and effectiveness. The grinding wheel may consist of a monolayer of CBN particles embedded in a typically nickel substrate designed with protrusion of the grains (crystals), as shown in FIG. 3A to remove material on the workpiece in a grinding operation. FIG. 3B further shows topographical data of a section of a grinding wheel surface with lateral axes 390 and topographical axis 392. In various embodiments, step 210 may include measuring topographical data of a section of a grinding wheel surface with respect to lateral axes 390 and topographical axis 392. FIG. 3C further shows topographical data of a grain (crystal) including the clearance angle of the grain. In various embodiments, step 210 may include measuring the clearance angle of a grain of the grinding wheel surface.

The workpiece may arrive at the grinding operation in the stock shape from casting, forging or metal additive routes from the primary manufacturing center (PMC). The grinding operation may be performed at a secondary operations center (SOC) with one or more grinding wheels. The grinding wheel(s) may be created at a wheel manufacturing center (WMC), supplied by vendors, distributors, or other third parties.

Electroplated (EP) grinding wheels tend to have very little tolerance for variation in process mechanics. Even slight variations may cause the abrasive mono-layer to be stripped and the component damaged when ground with a stripped wheel. Grinding wheels can be large in diameter with intricate edge-shapes or small in diameter such as a quill with simpler spherical, cylindrical, or toroidal shapes. Once a process has been qualified, the stability and consistency of the process largely depends on variations in incoming stock material, wheel preparation, and dressing and coolant quality and supply. Stock workpiece material tends to be beyond the control of the SOC. Elevated wheel quality is desirable and tends to only be in the control of the WMC. However, the SOC can bear responsibility of the finished part quality and its through-put. Consequently, characterization of the incoming wheels tends to be beneficial for the SOC.

Mere visual observations of incoming grinding wheels may not be sufficient to predicate changes in the process either at the SOC or the WMC. Intermediary surface topography metrics comparing wheels are desirable both for quality control at the WMC and process mechanics control at the SOC. Fine-tuning for the metrics from a topographic evaluation tends to be onerous, especially after a process is locked in place due to multiple constraints arising from the complexities of the grinding process. The inventors of the present disclosure recognize the need to connect topographical measurements with actual process physics; the former is nowadays relatively easily enabled by the availability today of high-magnification optical microscopes which have white-light and blue-light scanning capabilities (e.g., microscopy) and data post-processing capabilities such as stitching and flattening. Added advantages today include portability of data into scientific computing software, such as MATHEMATICA® for example, innately capable of algebraic data reduction.

Figure 4A:
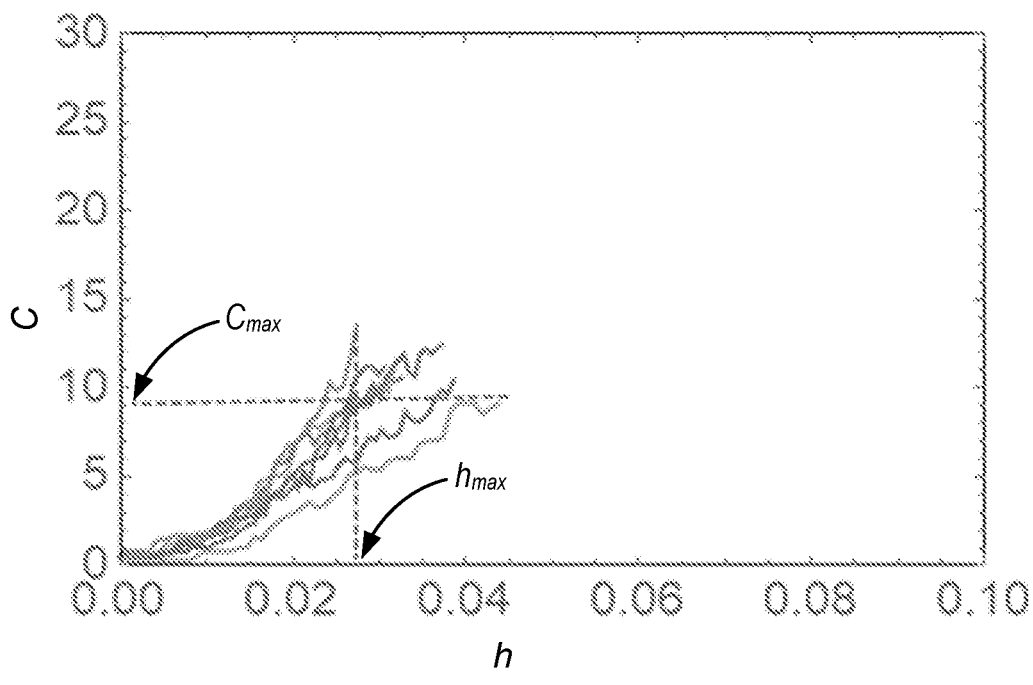
FIG. 4A illustrates a graph showing areal grain density calculated from topographical data at multiple areas in a single tool as a function of distance h according to various embodiments.
Figure 4B:
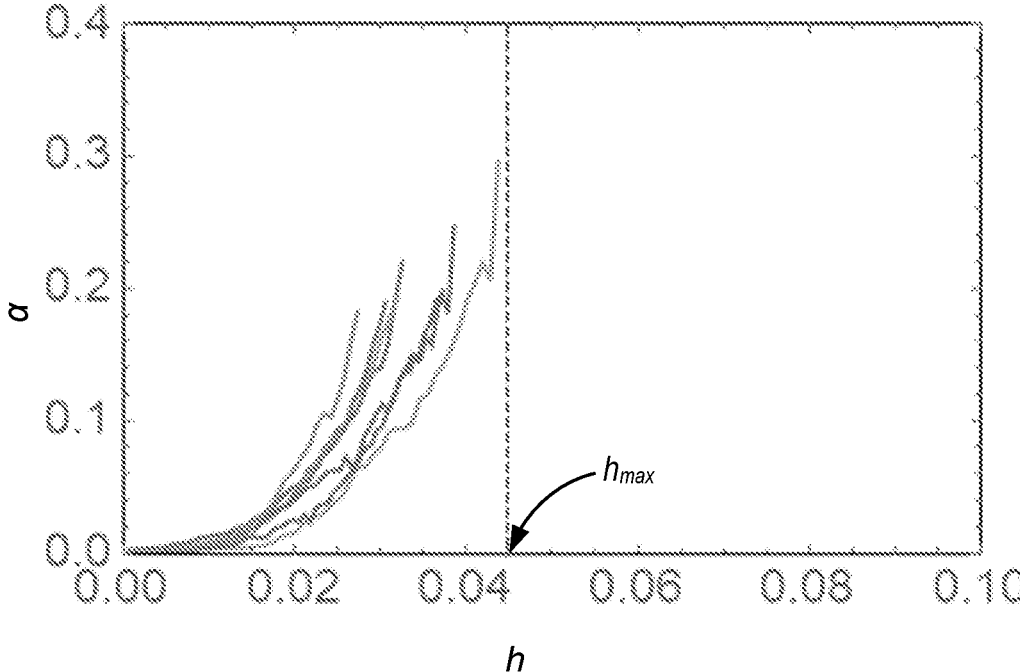
FIG. 4B illustrates a graph showing cross-sectional area fraction calculated from topographical data at multiple areas in a single tool as a function of distance h according to various embodiments.

With reference to FIG. 4A and FIG. 4B, the topographic data may be first corrected for curvature within its two lateral bounds, for example using the native software of the microscope, though in various embodiments non-native software of the microscope is used. With momentary reference to FIG. 3B, the data may be converted to a point cloud in two lateral axes and one topographical axis. With reference again to FIG. 4A and FIG. 4B, the data may then be imported and parsed in a scientific computing software. Then, within the two lateral bounds of the nominally flat surface, an interpolation for position along the topographical axis may be constructed. This interpolation may be cross-sectioned in successive planes at distance h along the topographical axis from the highest point to reveal the number C and area-fraction α of flat intersections. Thus, the topographical data may be reduced to values C(h) and α(h), where C(h) is the density of crystals at a given depth h (e.g., number of grains per unit area participating in cutting) and α(h) is the area fraction of crystals protruding at a given depth h. h may be the local wheel penetration into the workpiece. In this regard, step 210 may include calculating values C(h) and α(h) using the topographical data. h may be a distance or depth from a reference point on the grinding wheel (e.g., the highest point of the grinding wheel or the like). An example of data acquired from multiple areas in a single tool are shown in FIG. 4A and FIG. 4B.

The ability to perform replicas on a wheel mounted on the spindle is desirable. Such a technique is non-invasive and impacts the production schedule minimally. The topography data may be processed offline to obtain various coefficients—e.g., C(h) and α(h)—and a physics based process simulator, which takes the coefficients as input, may be made to output optimized feed-rates based on the prevailing topography of the wheel (see FIG. 5).

Figure 5:
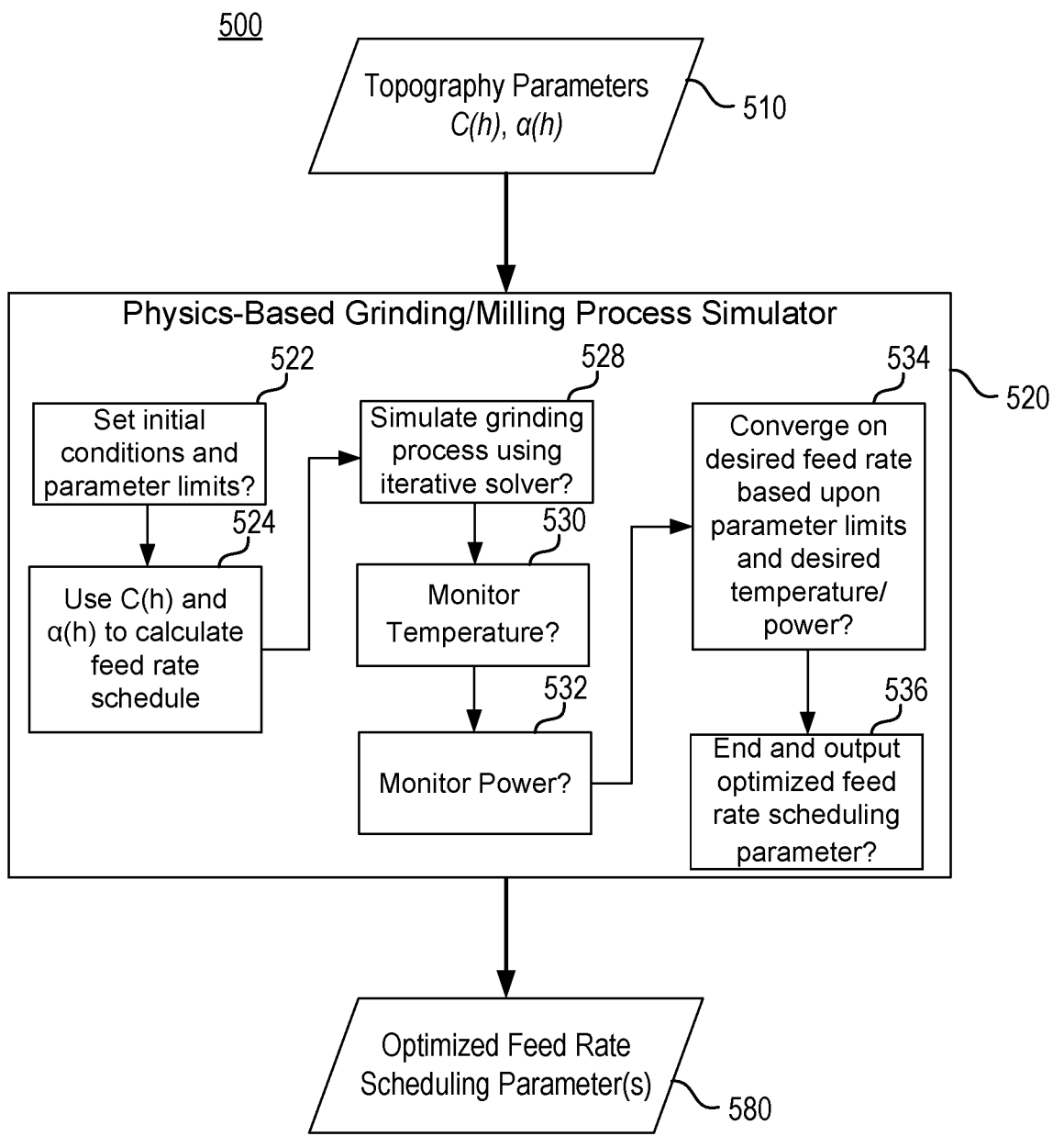
FIG. 5 illustrates a schematic view of a virtual machining simulation environment according to various embodiments.

Method 200 includes calculating one or more feed rate scheduling parameters using the topography (step 220). With reference to FIG. 5, a flow chart 500 of a physics-based grinding process simulator 520 (also referred to herein as a virtual machining simulation environment), which takes the coefficients C(h) and α(h) as input parameters 510, is provided to output feed rate scheduling parameters 580, such as optimized feed-rates, based on the prevailing topography of the wheel. In this regard, step 220 may be performed by physics-based grinding process simulator 520. In various embodiments, the physics-based grinding process simulator 520 includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Simulator 520 may be initiated by a user or other program and initial conditions and parameter limits may be set at step 522. Exemplary initial conditions include stickout length (e.g., measured in inches), drilling feed (e.g., measured in inches per minute (ipm)), rotational speed (e.g., measured in rpm), and step size for the iterative solver, among others. Exemplary parameter limits include maximum feed rate (i.e., the maximum translational speed; e.g., measured in ipm), among others.

At step 524, simulator 520 may use coefficient C(h) and α(h) to calculate optimized grinding wheel feed rates. The logic of calculating the optimized feed rates using the coefficients C(h) and α(h) rests on the power of applying the formulation everywhere that the grinding wheel is in contact with the workpiece. In particular, equation 1 and equation 2 may be used so that variable h can be solved from equation 3.

$$C(h)=A(h/d_g)^B \qquad \text{Eq. 1}$$

$$\alpha(h)=\alpha(h/d_g)^b \qquad \text{Eq. 2}$$

$$h=\lambda^{1/2}C(h)^{-1/2}\alpha(h)^{-1/2} \qquad \text{Eq. 3}$$

In equation 3, $$\lambda=q''/V_s \qquad \text{Eq.4}$$

where q" is local material volume remove rate per unit area and $V_s$ is local peripheral speed of travel of grinding crystals relative to the part. q" may be derived using the shape and instantaneous trajectory of the wheel encompassing the instantaneous feed rate of the tool tip. In various embodiments, q'=Vd, where q' is the specific material removal rate, V is the feed rate (velocity), and d is the removing depth. Thus, $$h(\lambda) = \left(\frac{\pi(2+b-B)^2}{16aAd^{-b-B}}\right)^{\frac{1}{2+b+B}} \lambda \frac{2}{2+b+B}.$$ Eq. 5

Elemental forces can be calculated as $$\begin{cases} dF_t = \left(u_c(rCh^2) + P''_{pl} + \mu p_a A_f\right)dA = \left(u_c\lambda + P''_{pl} + \mu p_a A_f\right)dA \\ dF_n = \left(k_1 u_c(rCh^2) + 0 + p_a A_f\right)dA = (u_c\lambda k_1 + 0 + p_a A_f)dA \end{cases},$$ Eq. 6 where if $u_c$, the energy of material removal per unit volume (specific energy), is treated as a constant, topographic effects are cancelled, but retained if $u_c$(h), A is grinding area, F is force on area dA, and r is the ratio of width of chip to penetration h. Feed scheduling is primarily based on forces and h. The feed rate of the wheel directly impacts q" and thus λ. In various embodiments, grain penetration h and forces $F_{total}$ are simultaneously limited, choosing optimal feed rate to be the smaller value for chosen limits on h and $F_{total}$. $P''_{pl}$ is the plowing force per unit area (MPa), μ is the coefficient of sliding friction, $p_a$ is the normal pressure due to sliding (N/mm²), $A_f$ is the wear flat to apparent area of contact ratio, and $k_1$ is the thrust to cutting chip-formation force ratio. Total force components in a portion are given by equation six (6). Global resultant forces on the tool may be obtained by summing contributions from all portions within the engagement contour (the contour of the tool in contact with the workpiece) vectorially.

Equation seven (7) vectorially expresses elemental normal ($dF_n$) and tangential ($dF_t$) forces on the portion as experienced by the tool. To calculate $dF_t$, − is used for counter-clockwise and + is used for counter-clockwise tool rotation in tool coordinate system (TCS).

$$\begin{cases} dF_n = -dF_n\hat{n} \\ dF_t = \pm dF_t\hat{t} \end{cases}$$ Eq. 7

As an analogy with shallow-cut surface grinding (SCSG), $F_t$ is the tangential (feed) force in (measured in Newtons (N)), and $F_n$ is the normal (thrust) force in SCSG, (N).

Figure 2B:
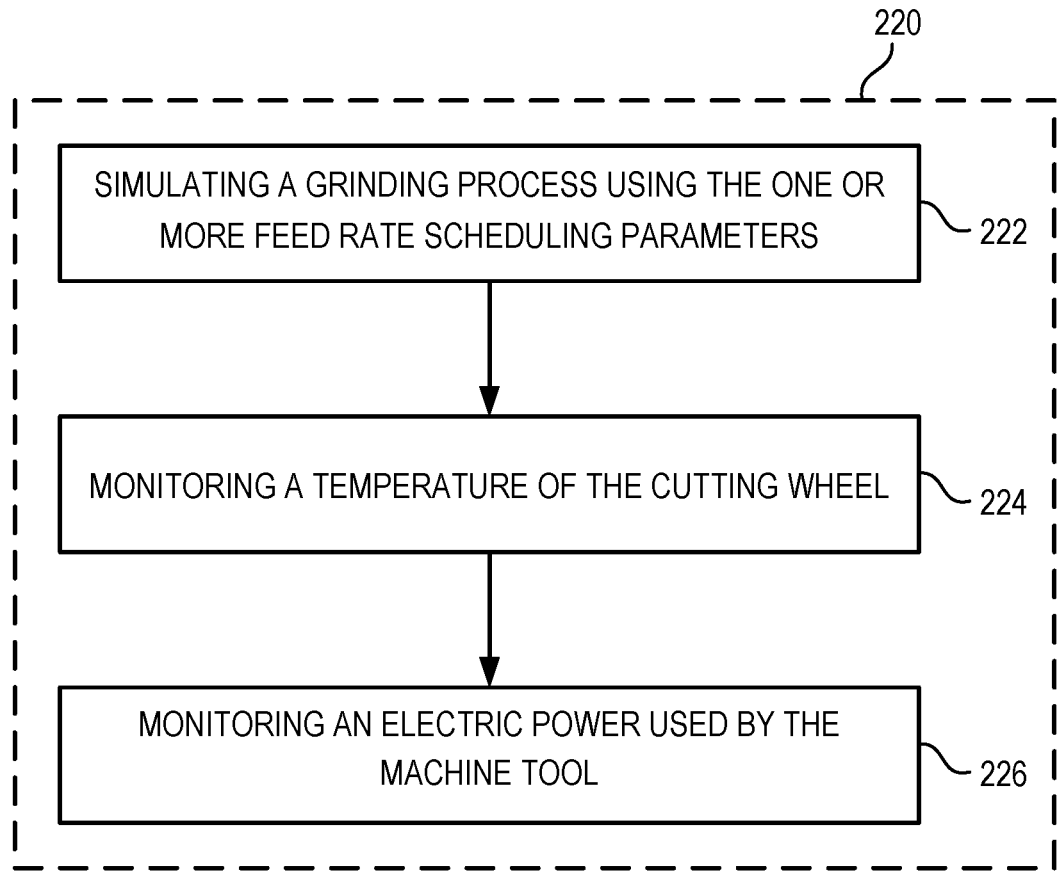

At step 528, simulator 520 may simulate a virtual grinding process using built-in physics based equations (see step 222 of FIG. 2B). At each iteration, simulator 520 may calculate an updated feed rate scheduling parameter (e.g., instantaneous feed rate, cutting depth, and/or spindle speed). The updated feed rate scheduling parameter may be used during the next iteration to converge on one or more desired solutions. Stated differently, the feed rate scheduling parameter may be iteratively solved by simulating a metal grinding process (i.e., using physics based equations) of the grinding wheel in a virtual machining simulation environment (i.e., using software) using one or more topography parameters (i.e., C(h) and/or α(h)).

At steps 530 and 532, simulator 520 may calculate/monitor the temperature of the grinding wheel and power consumed by the tool machine (e.g., electric motor), respectively (see step 224 and step 226 of FIG. 2B). At step 534, simulator 520 may continue to iteratively solve the built in physics based equations to converge on a desired feed rate—e.g., based on desired temperature and power consumption, among other desired parameters.

At step 536, once a desired optimized feed rate is achieved, the simulator 520 may output the optimized feed rate scheduling parameter 580 (such as feed rate, cutting depth, spindle speed, etc.) to be implemented during a physical grinding process on an actual (as opposed to virtual) workpiece.

Power monitoring in grinding processes may be performed using various methods. These methods range from using simple transducers to complete turn-key setups integrating with the machine controller. However, a missing component in legacy systems is the wheel condition input. In this regard, the physics-based grinding modeling software of the present disclosure may be provided as an add-on to a virtual grinding modeling framework. The three components namely, a) grinding power monitoring, b) wheel topography measurement and a mathematical data-reduction algorithm and c) virtual grinding modeling framework can allow spindle speed and feed rate scheduling tuned to current state of the wheel. This approach expands the scope of use of power monitoring which currently is used merely to detect power excursions while investigating part quality deviations. The systems and methods of the present disclosure can also be useful in robotic grinding and deburring operations where belt power and topography can also be measured.

The systems and methods of the present disclosure provide feed scheduling based on grinding power and wheel topography measurements in various wheel systems (vit., EP and MB) and configurations (machine tool, robot)

The systems and methods of the present disclosure provide data from a microscope (e.g., as a surface STL file) and convert into an interpolation object in scientific computing software (e.g., MATHEMATICA®) to perform subsequent calculations.

In various embodiments, there may be one grain which may be protruding much more than others in the data, which it is desired to be handled in an appropriate way. It is contemplated that in this manner repeatable C(h) and α(h) curves as shown in FIG. 4A and FIG. 4B can be obtained. Disparities in various curves may also reveal poor wheel quality control.

Some nuances to C(h) and α(h) pertinent to electroplated wheels is explained here. Initially it is expected for C(h) to increase with h since the cross-sections cut through more and more grains, but eventually it is expected for C(h) to start to decrease with h since the cross-sections start to enter the nickel plating and multiple areas coalesce. Therefore, it is desirable for the data to be clipped at $h_{max}$ as shown in FIG. 4A. The α(h) data may also be clipped at $h_{max}$, as shown in FIG. 4B, since from this limit onwards, the curve is expected to asymptotically tend to unity since it would start to include the nickel substrate encapsulation of the crystal.

Figure 6:
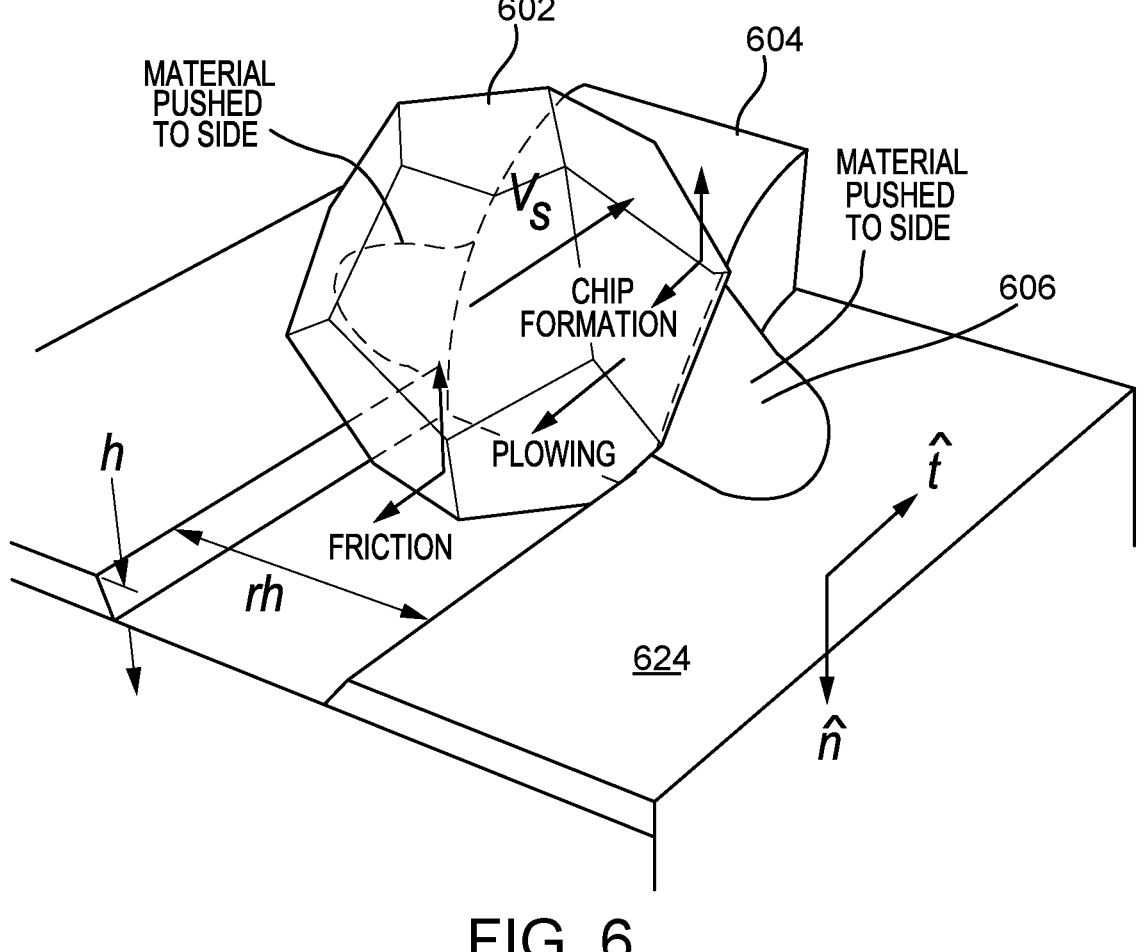
FIG. 6 illustrates a schematic view of a grinding wheel grain cutting into a workpiece according to various embodiments.

The power law form $a\,h^b$ for C(h) and α(h) predicates that the quantities C(0)=α(0)=0 when h=0. It is applicable once the wheel is "run-in" i.e. crystals develop wear flats as shown in FIG. 6 also. A minority of crystals may develop a wear flat at an angle as shown in FIG. 3C or simply cleave due to the self-sharpening effect and create a new tip.

However, the form allows easy differentiation, integration, and inversion of various subsequent functions.

Moreover, a limit $h_{max}$ may be imposed on the raw topographical data to capture the encapsulation effect of the nickel substrate. It is desirable for the grain penetration depth h to be limited to $h_{max}$ (for example a cutting depth of the grinding wheel may be limited to a maximum grain height), to ensure control over grain forces and proper chip evacuation. This tends to depend on average grain size $d_g$, amount of encapsulation, and statistical protrusion of the grains.

Grain penetration h can be solved as explained above with respect to equations 1 through 5. Different portions of the wheel are subject to different amounts of local material removal rate q" and possibly different peripheral velocity $V_s$ proportional to the rotation speed of the tool. Local forces and power contribution are calculated knowing local h. Therefore, it is desirable to control h in grinding with an EP wheel. The present disclosure provides the power-law formulation of the static grinding surface so that h is directly expressible as a function of $\lambda$.

A grinding procedure of the present disclosure can work on axis-symmetric wheels which either have straight-line or curvilinear profiles since local material removal rate q" drives the fine-tuned feed-rate. Another lever to control for his the rotational speed of the tool which directly changes the V at all locations on the tool.

If the toolpath consists solely of or predominantly of 3-axis motions of the tool, simple feed over-ride (% values) can be used for the purpose of using wheel topography fine-tuning. This is also applicable for 5-axis toolpaths only slightly departing from 3-axis.

Power-law fits to C(h) and $\alpha$(h) functions yield a simple way to compare wheels of same geometry but different grain and surface topographies. The power law fits carry over to process mechanics modeling to quantitatively predict forces, power, and temperature changes due to changing wheel topography metrics.

$\alpha$(h) is an intermediary metric, but it drives all other geometric and physical calculations. It is a measure of uniformity of grain protrusions on the wheel surface.

Systems and methods of the present disclosure can be applied to substantially automated and robotically controlled grinding processes. Surprisingly, systems and methods of the present disclosure have shown that higher feed rates are sometimes beneficial to reducing part heating.

The present disclosure provides a method for evaluating grinding wheel topography to: (a) perform feed-scheduling with prevailing wheel condition and power monitored, and (b) find disparities in various C(h) and $\alpha$(h) curves from the same wheel to reveal poor wheel quality control at the secondary manufacturing center.

The present disclosure provides a method for fine-tuning an existing grinding process for incoming wheel surface topographic metrics (a) using in-situ microscopy near the grinding operation, (b) using a simple feed over-ride for altered wheel topographic metrics, and/or (c) to use a simple altered rotational speed of the wheel or tool to achieve controlled grain penetration into the work material.

The present disclosure provides process models which include actual topographic metrics data such as C($h_{max}$), $h_{max}$ to (a) control grain-penetration depth in electroplated wheels, and/or (b) to capture the effect of the extent of encapsulation of the crystals in the substrate on the process mechanics.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A feed rate scheduling method, comprising:

measuring a topography of a grinding wheel of a machine tool;

converting the topography to a point cloud having a topographical axis;

creating a plurality of successive cross-sectioned planes along the topographical axis, calculating a topography parameter of the grinding wheel based on the point cloud, the topography parameter comprising a density of crystals at a given depth (h) along the topographical axis; and calculating a feed rate scheduling parameter for a toolpath of the grinding wheel based on the topography parameter.

2. The method according to claim 1, wherein the calculating the feed rate scheduling parameter comprises simulating a metal grinding process of the grinding wheel in a virtual machining simulation environment using the topography parameter.

3. The method according to claim 2, wherein the calculating the feed rate scheduling parameter comprises monitoring an electric power used by the machine tool.

4. The method according to claim 3, wherein the calculating the feed rate scheduling parameter comprises determining that the electric power is within a predetermined threshold.

5. The method according to claim 1, further comprising creating a plurality of successive cross-sectioned planes along the topographical axis, wherein the topography parameter of the grinding wheel comprises a density of crystals at a given depth (h) along the topographical axis.

6. The method according to claim 5, wherein the topography parameter of the grinding wheel comprises an area fraction of crystals protruding at a given depth (h).

7. The method according to claim 1, wherein the feed rate scheduling parameter comprises an instantaneous grinding wheel feed rate.

8. The method according to claim 1, wherein the topography parameter comprises a plurality of values as a function of distance with respect to a reference point on the grinding wheel and a clearance angle of a grain of the grinding wheel, and the method further comprises limiting the topography parameter to a maximum distance ($h_{max}$).

9. The method according to claim 1, wherein the measuring the topography is performed using a microscopy process.

10. A grinding process simulator for feed rate scheduling for a grinding wheel, comprising:

a virtual machining simulation environment having a processor; and a tangible, non-transitory memory configured to communicate with the processor, the tangible, non-transitory memory having instructions stored thereon that, in response to execution by the processor, cause the virtual machining simulation environment to perform operations comprising:

receiving a topography parameter of the grinding wheel of a machine tool, wherein the topography parameter comprises a density of crystals at a given depth (h) of the grinding wheel (C(h)); and calculating a feed rate scheduling parameter for a toolpath of the grinding wheel based on the topography parameter of the grinding wheel.

11. The grinding process simulator according to claim 10, wherein the calculating the feed rate scheduling parameter comprises simulating a metal grinding process of the grinding wheel in the virtual machining simulation environment using the topography parameter.

12. The grinding process simulator according to claim 11, wherein the calculating the feed rate scheduling parameter comprises monitoring an electric power used by the machine tool.

13. The grinding process simulator according to claim 12, wherein the calculating the feed rate scheduling parameter comprises determining that the electric power is within a predetermined threshold.

14. The grinding process simulator according to claim 10, wherein the density of crystals at the given depth (h) of the grinding wheel (C(h)) is based on a plurality of successive cross-sectioned planes interpolated along a topographical axis corresponding to the grinding wheel.

15. The grinding process simulator according to claim 10, wherein the topography parameter comprises an area fraction of crystals protruding at a given depth (h) of the grinding wheel ($\alpha$(h)).

16. The grinding process simulator according to claim 10, wherein the feed rate scheduling parameter comprises a grinding wheel feed rate.

17. The grinding process simulator according to claim 10, wherein the topography parameter comprises a plurality of values as a function of depth (h) with respect to a reference point on the grinding wheel, and the operations further comprise limiting the topography parameter to a maximum distance ($h_{max}$).

18. A method, comprising:

measuring a topography of a grinding wheel of a machine tool;

converting the topography to a point cloud having a topographical axis;

calculating a plurality of topography parameters of the grinding wheel based on the point cloud, wherein the plurality of topography parameters comprises at least one of a density of crystals at a given depth (C(h)) of the grinding wheel, or an area fraction of crystals protruding at a given depth ($\alpha$(h)) of the grinding wheel; and calculating a feed rate scheduling parameter for a toolpath of the grinding wheel based on the plurality of topography parameters.

19. The method of claim 18, wherein the measuring the topography is performed in-situ using a microscopy process.

20. The method of claim 18, further comprising limiting a cutting depth of the grinding wheel to a maximum crystal height ($h_{max}$) of the grinding wheel.

\* \* \* \* \*